United States Patent
Reese et al.

(10) Patent No.: US 7,287,780 B2
(45) Date of Patent: Oct. 30, 2007

(54) TRAILER FRAME

(75) Inventors: Kent W Reese, Constantine, MI (US); Michael P Brady, Edwardsburg, MI (US); Joe H McMillin, Sturgis, MI (US); Roderick L Evans, Elkhart, IN (US)

(73) Assignee: Haulmark Industries, LLC, Bristol, IN (US)

( * ) Notice: Subject to any disclaimer, the term of this patent is extended or adjusted under 35 U.S.C. 154(b) by 534 days.

(21) Appl. No.: 10/979,351

(22) Filed: Nov. 2, 2004

(65) Prior Publication Data

US 2006/0091640 A1 May 4, 2006

(51) Int. Cl.
 *B62D 63/06* (2006.01)
(52) U.S. Cl. ..................................................... 280/789
(58) Field of Classification Search ................ 280/789, 280/795, 797, 799
 See application file for complete search history.

(56) References Cited

U.S. PATENT DOCUMENTS

| | | | |
|---|---|---|---|
| 2,677,571 A | 5/1954 | Williams | |
| 2,791,439 A | 5/1957 | Swanson | |
| 2,861,811 A | 11/1958 | Lassen | |
| 3,042,423 A | 7/1962 | Bock | |
| 3,254,914 A | 6/1966 | Steck | |
| 3,282,603 A | 11/1966 | Barth | |
| 3,751,064 A | 8/1973 | Goodson, Jr. | |
| 3,759,547 A | 9/1973 | Ankeny | |
| 3,797,850 A | 3/1974 | Stout et al. | |
| 3,891,231 A | 6/1975 | Snoberger et al. | |
| 3,907,356 A | 9/1975 | Sien | |
| 4,863,189 A * | 9/1989 | Lindsay | 280/789 |
| 5,215,331 A | 6/1993 | Pittman | |
| 5,256,024 A * | 10/1993 | Ross | 414/483 |
| 5,468,008 A | 11/1995 | Hecht | |
| H001587 H * | 9/1996 | Van Valkenburgh et al. | 280/789 |
| 5,769,478 A | 6/1998 | Vernese | |
| 5,979,972 A | 11/1999 | Gehman | |
| 6,254,132 B1 | 7/2001 | Lindsay | |

* cited by examiner

Primary Examiner—Faye M. Fleming
(74) Attorney, Agent, or Firm—Baker & Daniels LLP

(57) ABSTRACT

A trailer frame for use on a trailer including at least one pair of main support frame members that extend in a longitudinal direction of the trailer frame. The main support frame members have a deck side and a bottom side. In one embodiment, the trailer frame also includes a plurality of cross frame members extending between the main support frame members; and a plurality of extension frame members converging to a hitch point at a front extension of the trailer frame. The extension frame members are attached to respective main support frame members with one end of each extension frame member being notched so that upper sides of the extension frame members are flush with the deck side of the main support frame members while a portion of lower sides of the extension frame members overlap the bottom sides of the main support frame members. The main support frame members include I-beams and plate members extending between and attached to flanges on each of the I-beam main support frame members. The extension frame members have a rectangular tubular cross section.

36 Claims, 8 Drawing Sheets

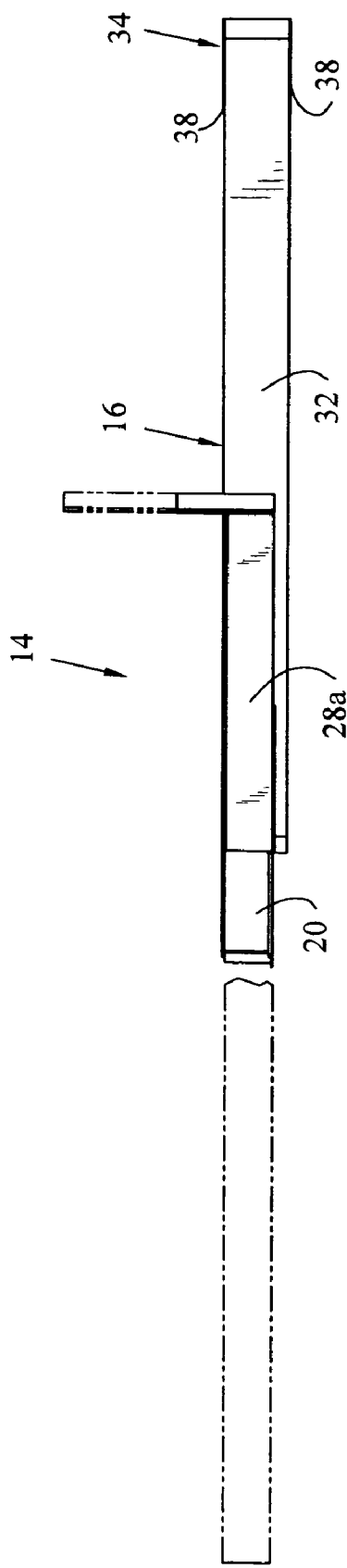
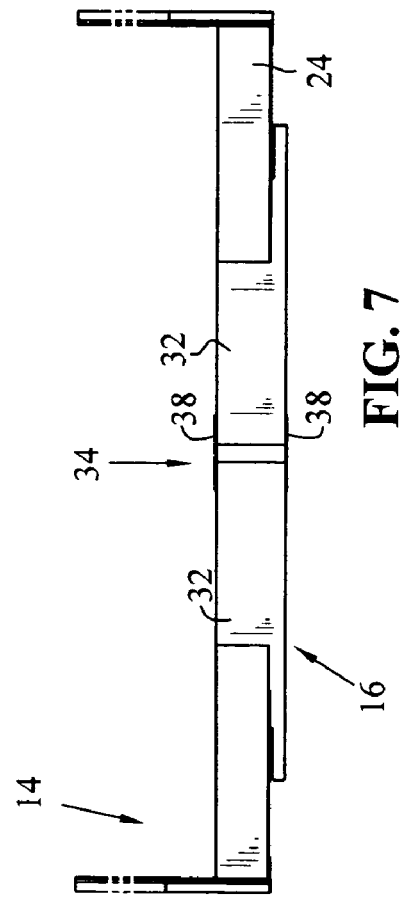
FIG. 6
FIG. 7

TRAILER FRAME

BACKGROUND OF THE INVENTION

This invention relates to a support frame for a trailer, an in particular to a support frame having an A-frame neck including rectangular tubular members that are attached to longitudinal main support I-beams.

There are currently a wide variety of support frames and configurations available for trailers. The size and configurations of the frames depends upon the type of trailer and the type and size of the load it is designed to carry. For cargo trailers designed to carry heavy loads, it is common to use at least two main supports, which may be I-beams, and that are spaced apart and positioned in the longitudinal direction of the trailer. Furthermore, it has been known to use an A- or V-shape type extension on the front of the trailer frame for use in hooking the trailer to a towing vehicle or for stabilizing the front of the trailer when parked.

One prior art patent disclosing a towed vehicle frame is U.S. Pat. No. 3,282,603 to Barth, incorporated in its entirety herein by reference. The frame in Barth includes three main support members running parallel in the longitudinal direction of the vehicle. The vehicle frame also includes a forward extension portion having an A configuration with two angle side braces and a forward extension of the middle main support member.

Another towed vehicle frame is disclosed in U.S. Pat. No. 3,751,064 to Goodson, Jr., incorporated in its entirety herein by reference. Goodson, Jr. discloses an under frame for a mobile home that includes a pair of longitudinally extending main support beams that are reinforced along a portion thereof with reinforcing beams. Extending towards the front of the frame is a pair of diagonal members that meet beyond a front end beam to form a hitch assembly.

A frame having a detachable hitch is shown in U.S. Pat. No. 3,759,547 to Ankeny, incorporated in its entirety herein by reference. Ankeny discloses a frame having a pair of longitudinal extending main I-beams and a pair of angled load bearing support members that form part of the detachable hitch.

Another frame for a towed vehicle is disclosed in U.S. Pat. No. 3,797,850 to Stout et al., incorporated in its entirety herein by reference. The frame in Stout, et al. includes a pair of longitudinal frame members and a pair of side rails extending around the longitudinal frame members. An A-frame shaped trailer tongue extends from the side rails and through the ends of the longitudinal frame members and converges at a forward hitch end that extends beyond the rest of the frame.

Another prior art trailer is disclosed in U.S. Pat. No. 3,891,231 to Snoberger, et al., incorporated in its entirety herein by reference. Snoberger, et al. discloses a trailer having a pair of longitudinal main beam frames and a V-shaped pair of C-channels projecting from the front of the frame and converging to a point.

Yet another trailer frame is disclosed in U.S. Pat. No. 5,215,331 to Pittman, incorporated in its entirety herein by reference. The frame in Pittman includes a pair of side beams and tongue extending in an A configuration from between the side beams to beyond a front beam. The tongue includes a pair of angled beam members that converge at a point.

Still another trailer frame design is disclosed in U.S. Pat. No. 5,468,008 to Hecht, incorporated in its entirety hereby by reference. The trailer frame in Hecht utilizes a pair of longitudinally extending side beams forming side edges of the frame. The frame also includes a transverse front end frame member and a V-shaped extension extending from the side beams and beyond the front frame to converge at a hitch.

It is an object of the present invention to provide a frame for a trailer having a pair of longitudinally extending main frame members and an A-frame front extension for attaching a hitch wherein the A-frame portion is mounted to the main beams in an unique fashion that provides a strong structure that has a flush top side and overlapping underside.

SUMMARY OF THE INVENTION

In one embodiment of the present invention, a trailer frame is provided for use on a trailer including at least one pair of main support frame members that extend in a longitudinal direction of the trailer frame. The main support frame members have a deck side and a bottom side. At least one pair of wheels is mounted to an axle to provide rolling movement to the trailer frame from a tow vehicle. The trailer frame may also include a plurality of cross frame members extending between the main support frame members; and a plurality of extension frame members converging to a hitch point at a front extension of the trailer frame. The extension frame members may be attached to respective main support frame members with one end of each extension frame member being notched so that upper sides of the extension frame members are flush with the deck side of the main support frame members while a portion of lower sides of the extension frame members overlap the bottom sides of the main support frame members.

The main support frame members may include I-beams and plate members extending between and attached to flanges on each of the I-beam main support frame members. The plate members may be attached at inward edges of the flanges, and the extension frame members may be mounted to respective plate members. At least one of the cross frame members may also be mounted to the plate members. The cross frame member mounted to the plate members may be notched and mounted so that an upper side is flush with the deck side of the main support frame members while a portion of a lower side overlaps the bottom sides of the main support frame members.

The pair of extension frame members may extend diagonally from the main support frame members to the hitch point. The trailer frame may further include a third extension frame member extending between the pair of diagonally extending extension frame members. The extension frame members may have a rectangular tubular cross section. At least one of the cross frame members may also have a rectangular tubular cross section, and one end of the third extension frame member may be mounted thereto. The trailer frame may further include plate members mounted between flanges on each of the main support frame members, and one end of each of the diagonally extending extension frame members is mounted to a respective plate member.

It is also a feature of the present invention to provide an embodiment of a trailer frame including at least one pair of main support frame members extending in a longitudinal direction of the trailer frame, wherein the main support frame members each include an upper flange and a lower flange and a plate member extending between and attached to the upper and lower flanges on each of the main support frame members. The trailer frame may also include at least one pair of wheels mounted to an axle to provide rolling movement to the trailer frame from a tow vehicle; a plurality of cross frame members extending between the main support frame members; and a plurality of diagonal frame members converging to a hitch point at a front extension of the trailer frame, wherein one end of each of the diagonal frame members may be mounted to a respective plate member on the main support frame members.

The main support frame members may include I-beams. The main support frame members may have a deck side and a bottom side, and the diagonal members may be mounted so that upper sides thereof are flush with the deck side of the main support members while a portion of lower sides of the diagonal frame members extend below the bottom sides of the main support frame members.

The diagonal frame members may be notched at one end where attached to the plate members, and a portion of the diagonal members overlaps the respective lower flanges on each of the main support members. At least one of the cross frame members may also be notched at both ends, and a portion of each end of the notched cross frame member overlaps the lower flange on each of the main support frame members. An upper side of the notched cross frame member may be flush with the deck side of the main support frame members. The diagonal frame members and the notched cross frame members may have a rectangular tubular cross section. The trailer frame may further include a longitudinal extension frame member extending between the diagonal frame members. One end of the longitudinal extension frame member may be attached to the notched cross frame member, and the other end extends to the hitch point.

Another feature of the present invention is to provide an embodiment of a trailer frame that includes at least one pair of main support frame members extending in a longitudinal direction of the trailer frame, wherein the main support frame members have a deck side and a bottom side; a plurality of cross frame members extending between the main support frame members; and a plurality of extension frame members converging to a hitch point at a front extension of the trailer frame. The extension frame members and at least one of the cross frame members may be mounted with upper sides thereof flush with the deck sides of the main support frame members, and lower sides of the extension frame members and the at least one cross frame member extending lower than the bottom sides of the main support frame members.

One end of each of at least two of the extension frame members may be notched. A portion of each notched end of the extension frame members may overlap respective bottom sides of the main support frame members.

The cross frame member having an upper side mounted flush with the deck side also has notched ends, and a portion of each notched end overlaps respective bottom sides of the main support frame members. The pair of main support frame members may each include an I-beam, and the extension frame members and the at least one cross frame member may have a rectangular tubular cross section.

The main support frame members may have an upper flange and a lower flange and a plate attached to and extending between inner edges of the flanges on each of the main support frame members. The trailer frame may include three extension frame members with one of the extension frame members attached to at least one cross frame member and extending therefrom in a longitudinal direction. The ends of the at least one cross frame member and one end of each of the other two extension frame members are mounted to respective plate members on the main support from members.

It is also a feature of the present invention to provide an embodiment of a towable trailer including at least one pair of wheels mounted to an axle to provide rolling movement to the trailer from a tow vehicle; a trailer deck; and a trailer frame supporting the trailer deck including at least one pair of main support frame members extending in a longitudinal direction of the trailer. The main support frame members may have a deck side and a bottom side with a plurality of cross frame members extending between the main support frame members. At least one of the cross frame members may have notched ends with the notched ends mounted to respective main support frame members. An upper side of at least one cross frame member may be flush with the deck side of the main support frame members, and a plurality of diagonal frame members may converge to a hitch point at a front extension of the trailer frame. One end of each diagonal frame member may be notched and mounted to respective main support frame members with upper sides of the diagonal members being flush with the deck sides.

Portions of the ends of the notched cross frame member and the diagonal frame members may overlap the bottom sides of the main support frame members. The notched cross frame member and the diagonal frame members may have a rectangular tubular cross section, and the main support frame members may include I-beams.

The trailer may further include a longitudinal extension frame member extending between the diagonal frame members, and one end of the longitudinal extension frame member may be attached to the notched cross frame member and the other end may extend to the hitch point.

The main support frame members may each include an upper flange and a lower flange and a plate member extending between and attached to the upper and lower flanges on each of the main support members, and a portion of the notched ends may be mounted to the plate members.

It is yet another feature of the present invention to provide an embodiment of a towable trailer including at least one pair of wheels mounted to an axle providing rolling movement to the trailer from a tow vehicle; a trailer deck; and a trailer frame including at least one pair of main support frame members extending in a longitudinal direction of the trailer frame, and wherein the main support frame members each include an upper flange and a lower flange and a plate member extending between and attached to the upper and lower flanges on each of the main support frame members. A plurality of cross frame members may extend between the main support frame members with at least one of the cross frame members being notched at the ends thereof and a portion of the notched ends being attached to the plate members. A plurality of extension frame members may be attached at one end thereof to respective main support frame members and converge to a hitch point at a front extension of the trailer frame.

The extension frame members may also be notched at the ends attached to the main frame support members, and a portion of the notched ends of the extension frame members and the notched cross frame member may overlap respective bottom sides of the main support frame members. Upper sides of the extension frame members and the notched cross frame member may be flush with deck sides of the main support frame members. The main support frame members may include I-beams, and the extension frame members and the notched cross frame members may have a rectangular tubular cross section.

BRIEF DESCRIPTION OF THE DRAWINGS

The above-mentioned and other features and objects of this invention and the manner of obtaining them will become more apparent and the invention itself will be better understood by reference to the following description of an embodiment of the present invention taken in conjunction with the accompanying drawings, wherein:

FIG. 2A is a close up perspective view of the area indicated in FIG. 2 of an A-frame member intersecting one of the main beams;

FIG. 6 is a side view of the trailer frame of FIG. 2;

FIG. 7 is a front view of the trailer frame of FIG. 2;

Figure 1:
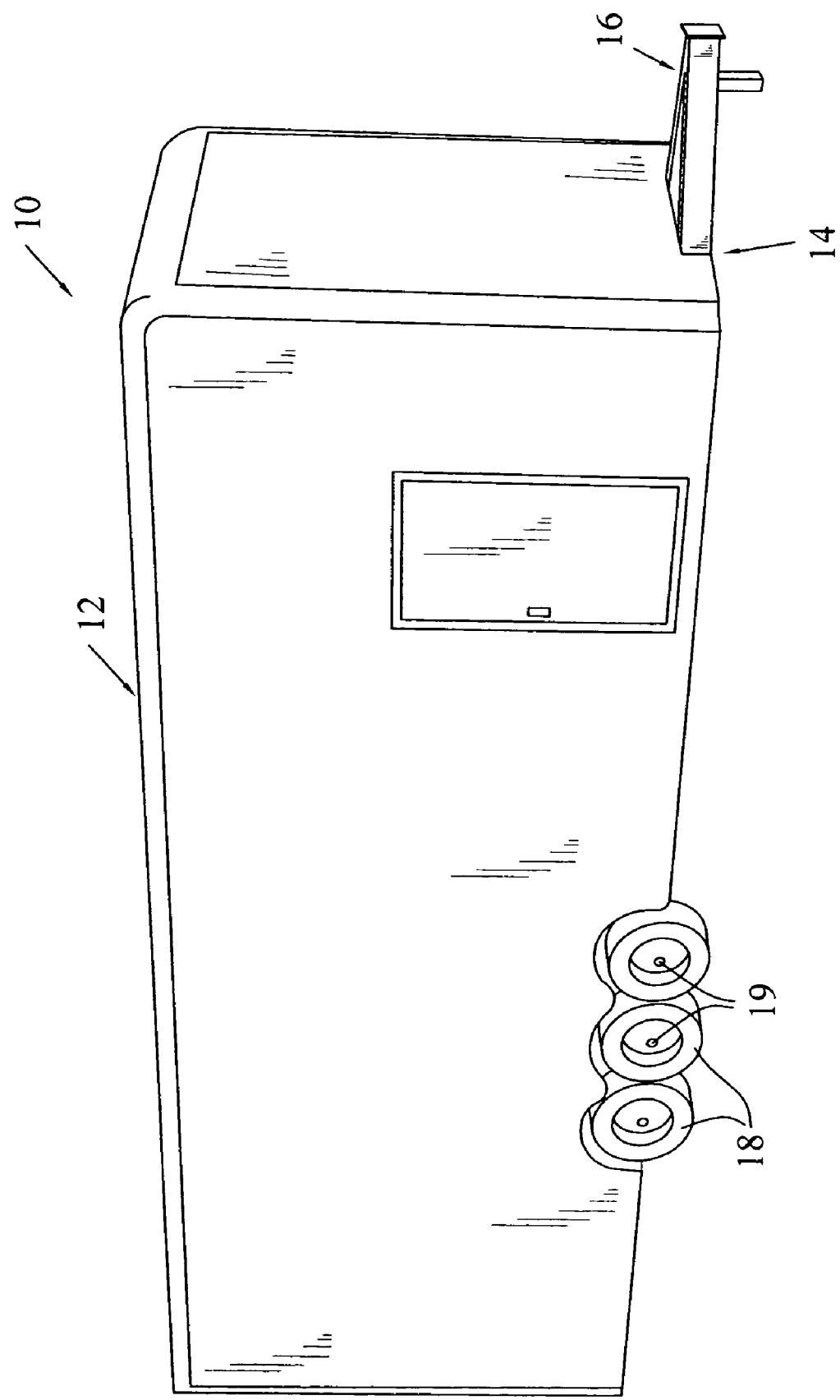
FIG. 1 is a perspective view of a trailer employing an embodiment of a frame of the present invention.
Figure 2:
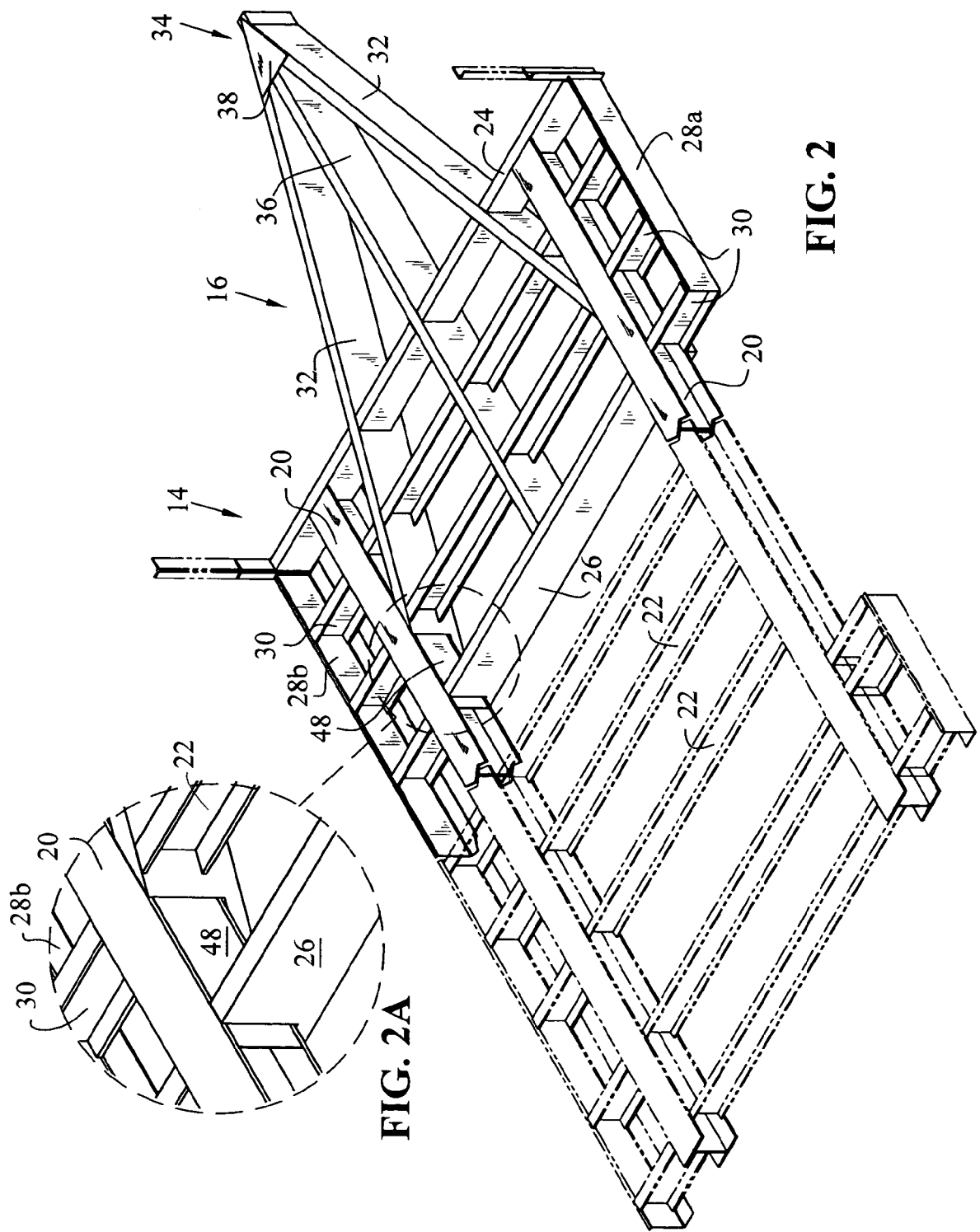
FIG. 2 is a perspective view of the top front end of the trailer frame of the present invention removed from the trailer.
Figure 3:
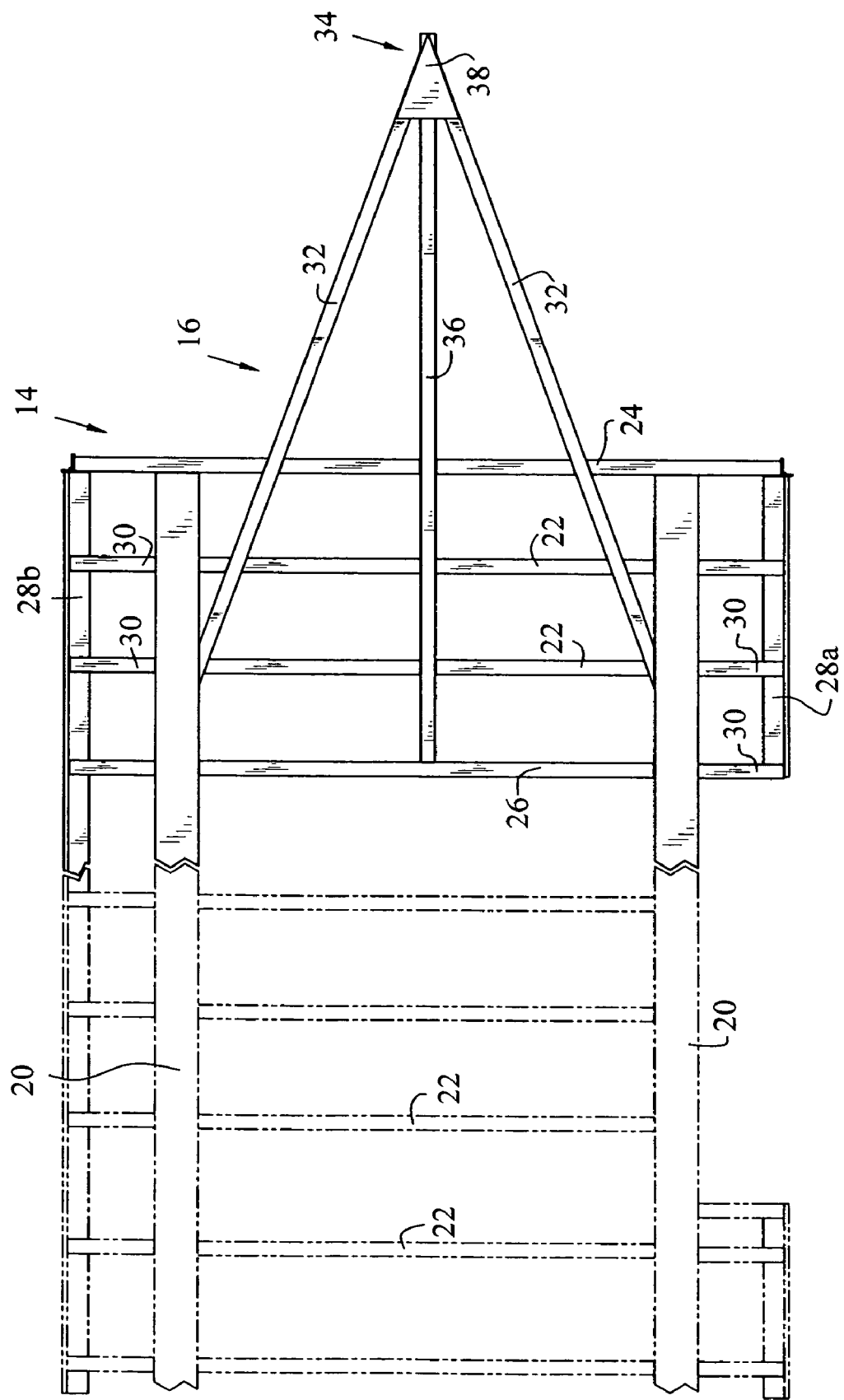
FIG. 3 is a top plan view of the front portion of the trailer frame of FIG. 2.
Figures 4, 4A:
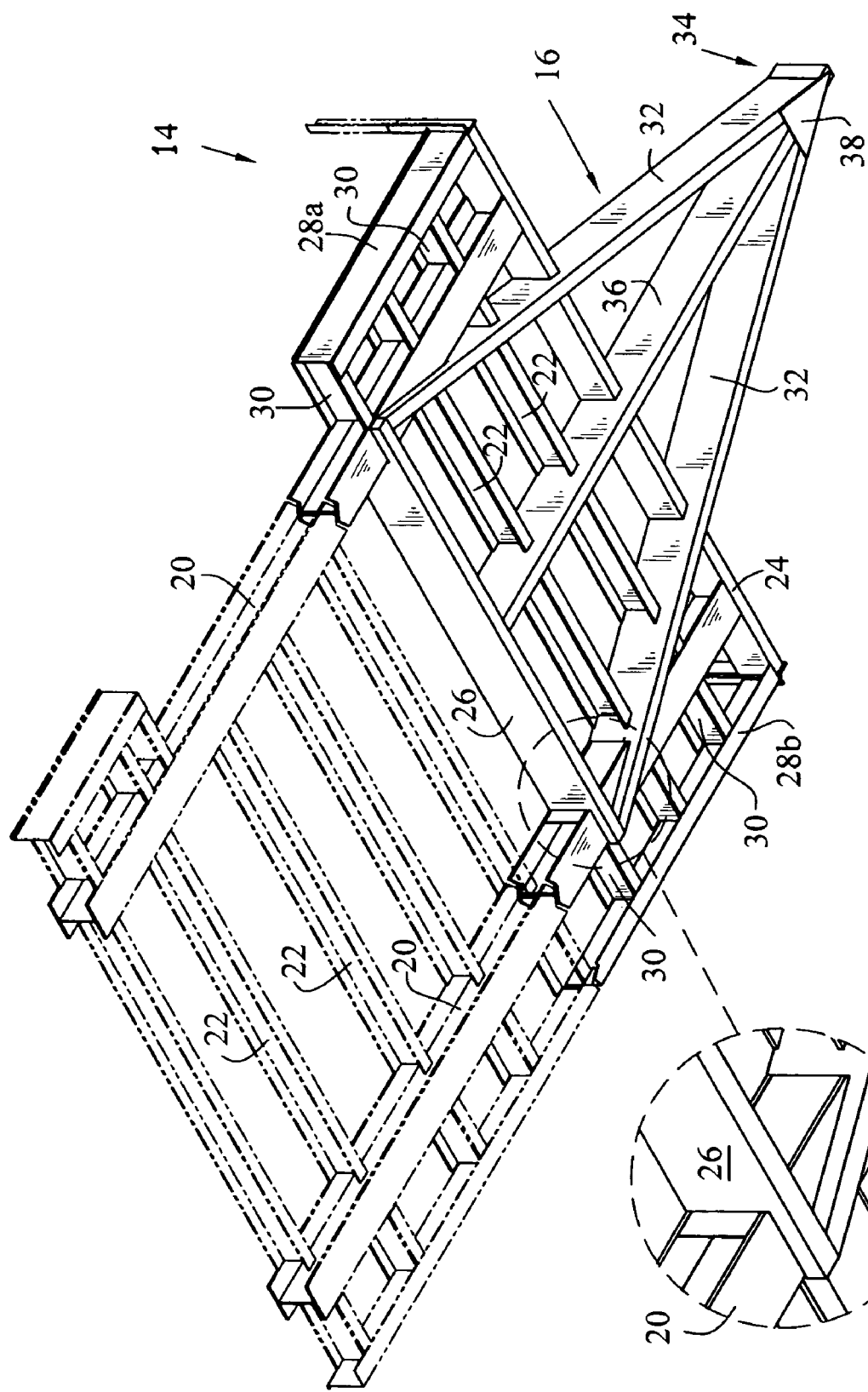
FIG. 4 is a bottom perspective view of the trailer frame of FIG. 2.
FIG. 4A is a close up perspective view of the area indicated in FIG. 4 of the A-frame member intersecting the main beam.
Figure 5:
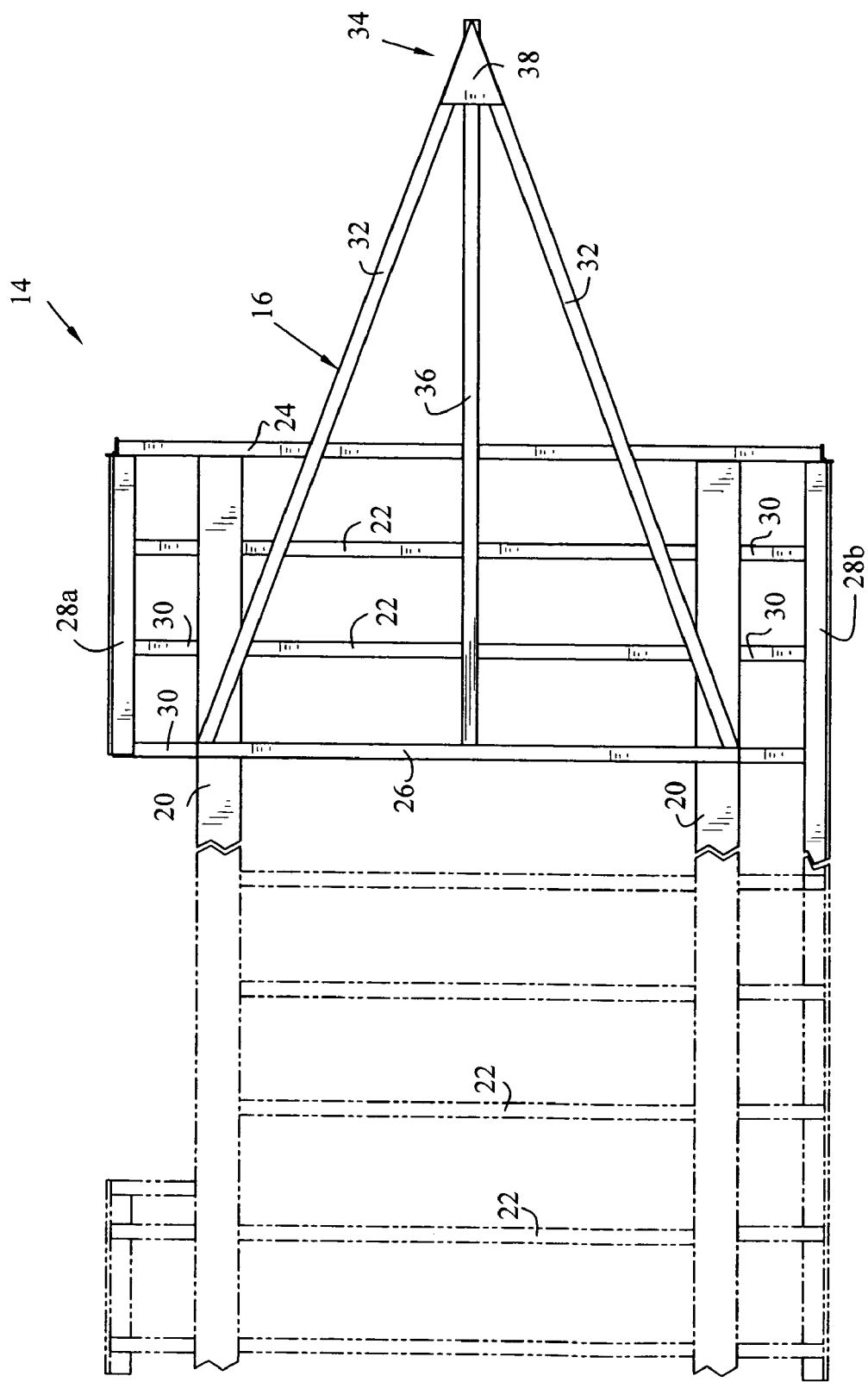
FIG. 5 is a bottom plan view of the trailer frame of FIG. 2.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIG. 1, a towable trailer is shown generally indicated as 10. Towable trailer 10 is designed and configured to be pulled by a tow vehicle (not shown) for transporting the trailer and any cargo contained therein to a desired location. Trailer 10 includes a trailer body generally indicated as 12 including a deck, and a trailer frame generally indicated as 14. Trailer frame 14 includes an A-frame or frontal extension generally indicated as 16 for use in hitching trailer 10 to the tow vehicle and for supporting the front of the trailer when parked. Providing rolling movement to the trailer is a set of wheels 18 having axles 19, which are connected to frame 14.

Referring now to FIGS. 2-7, the front portion of trailer frame 14 and A-frame 16 are depicted in greater detail. A line break is provided between the front portion of trailer 14 and the rear portion to indicate that the subject invention may be used with trailers of any length. In addition, a portion of trailer frame 14 is depicted in phantom lines as this portion of the trailer is well known.

Trailer frame 14 includes a pair of main support frame members 20 that extend along the longitudinal direction of trailer 10. Trailer frame 14 also includes a plurality of cross frame members 22, a front cross frame member 24, and a base cross frame member 26 located at the base of A-frame 16. Located to the outside of main support frame members 20 are side rails 28a, 28b and side rail supports 30.

A-frame 16 includes a pair of diagonal extension frame members 32 with one end of each diagonal frame member mounted to a respective main support frame member 20. The opposite ends of diagonal extension frame members 32 converge to a hitch point generally indicated as 34. A-frame 16 also includes a central longitudinally extending extension frame member 36 spaced between diagonal extension frame members 32 and attached to base cross frame member 26. Sandwiching the extension frame members at hitch point 34 are a pair of triangular shaped plates 38.

Figure 8:
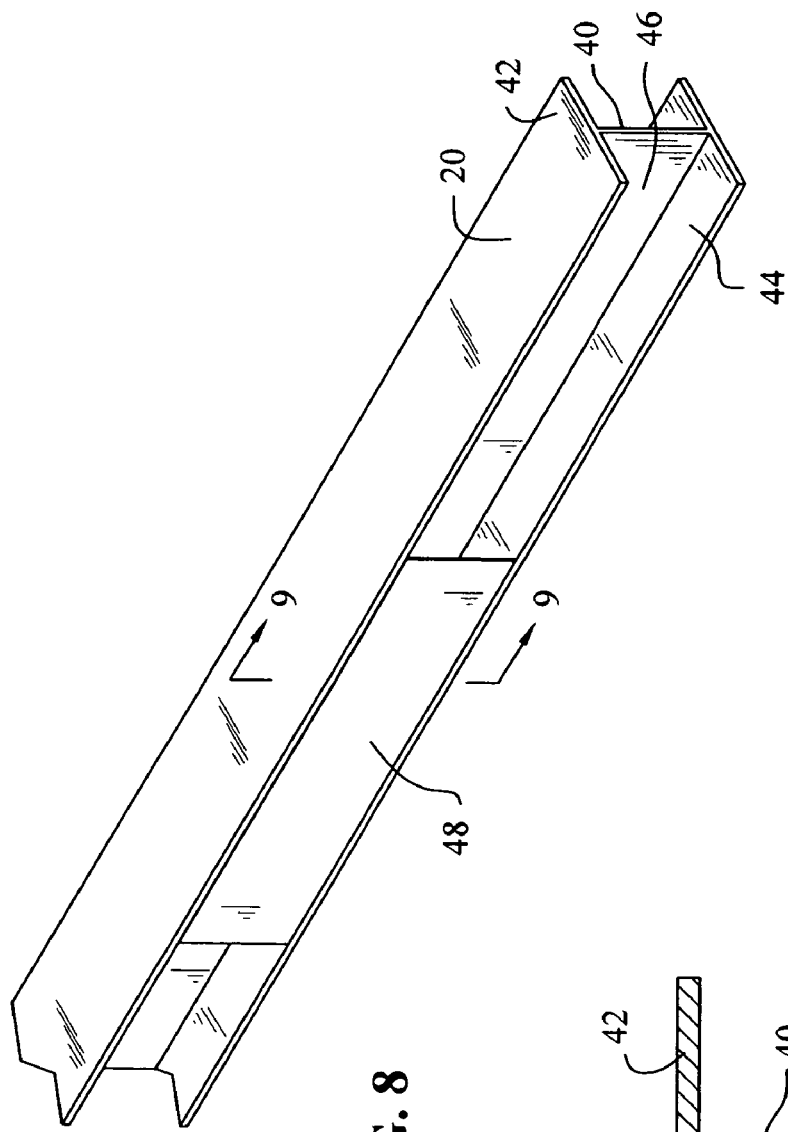
FIG. 8 is a perspective view of one of the main beams removed from the trailer frame.
Figure 9:
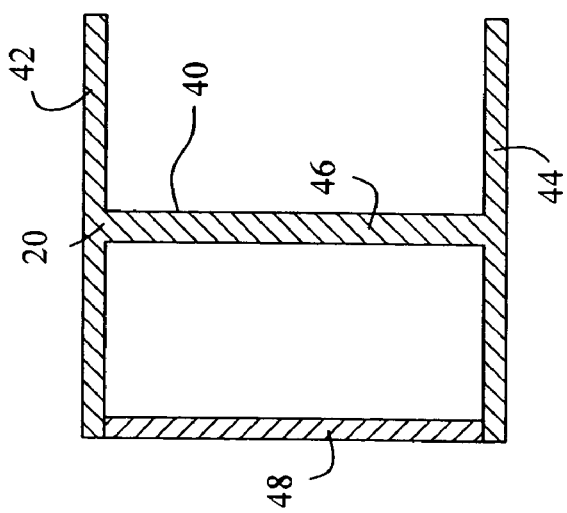
FIG. 9 is a cross-sectional view of the main beam of FIG. 8 taken along line 9-9.

Referring now to FIGS. 8 and 9, in the embodiment depicted, it can be seen that main support frame members 20 include an I-beam 40. I-beams 40 include an upper flange 42 that defines a deck side 43 of trailer frame 14, a lower flange 44 that defines a bottom side 45 of trailer frame 14, and a web 46 extending transversely between the flanges. Main support frame members 20 also each include a plate member 48 attached to and extending between inner edges of upper flange 42 and lower flange 44 on each I-beam. Plate member 48 is attached to the flanges using a known method such as by welding. Plate 48 may also be attached to the outer ends of the upper and lower flanges as opposed to between them as shown.

Figure 10:
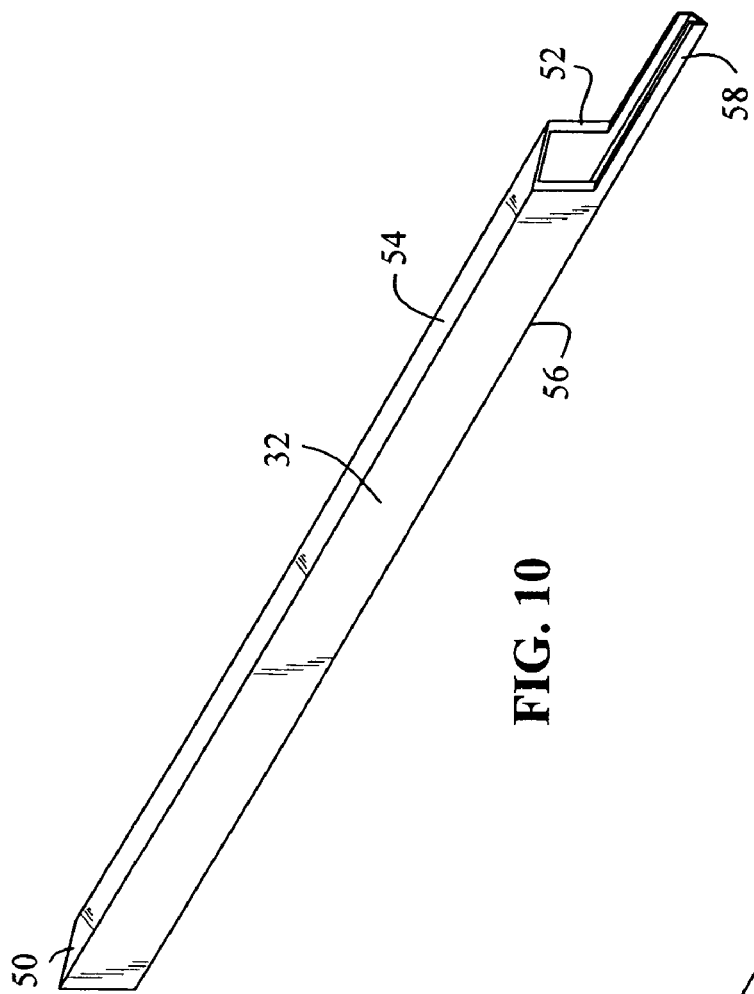
FIG. 10 is a perspective view of one of the A-frame diagonal members.

Referring now to FIG. 10, in the embodiment shown, diagonal extension frame members 32 have a tubular rectangular configuration. One end 50 of the diagonal extension members is angled for joining the extension frame members at hitch point 34. The other end 52 of diagonal extension frame members 32 is notched. The diagonal extension frame members 32 also each include an upper side 54 and a lower side 56. The notched end 52 of the extension frame members is also angled, but at a direction opposite that of angled end 50 as shown in FIG. 10, and the notched end includes a projection 58 extending from lower side 56.

Figure 11:
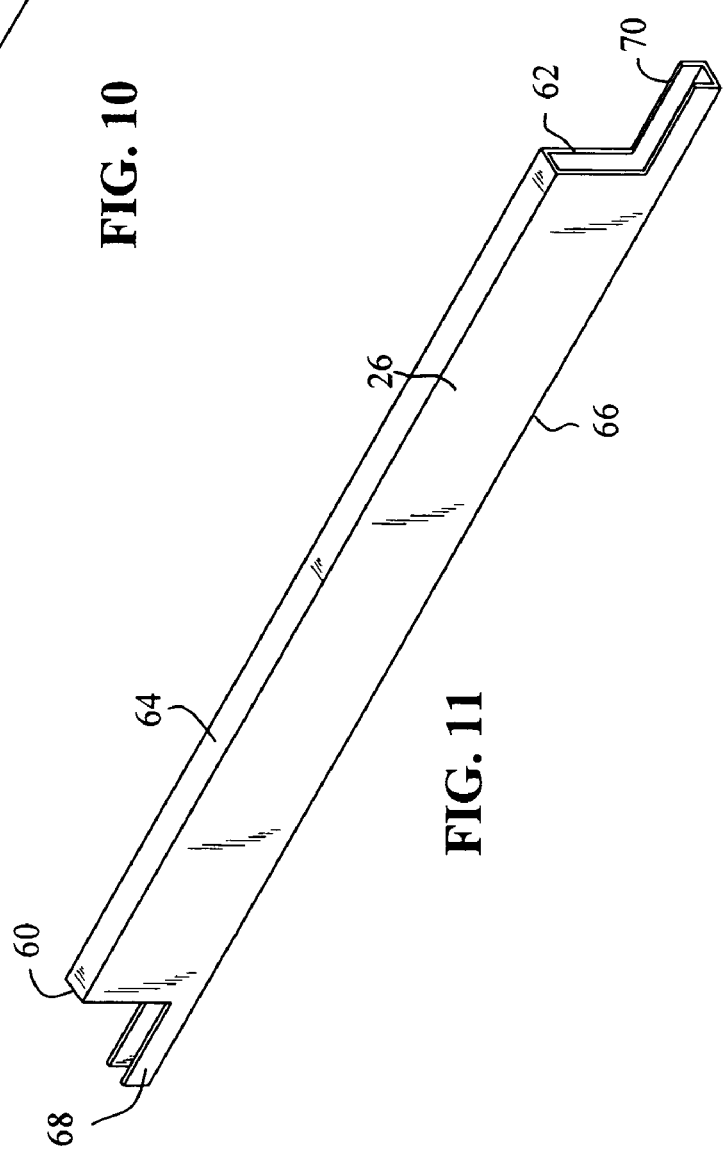
FIG. 11 is a perspective view of a rectangular cross beam at the base of the A-frame.

Referring now to FIG. 11, base cross frame member 26 has a pair of notched ends 60, 62. Notched ends 60, 62 are not angled as notched ends 52 of diagonal extension frame members 32 as the base cross frame member is mounted transversely to main support frame members 20 instead of at an angle as diagonal extension frame members 32. Base cross frame member 26 has a rectangular tubular configuration in the embodiment shown and includes an upper side 64 and a lower side 66. A pair of projections 68, 70 extend from base cross frame member 26 at notched ends 60, 62, respectively, along lower side 66.

In the embodiment of trailer frame 14 shown, central longitudinal extension frame member 36 also has a rectangular tubular configuration as does the front cross frame member 24. The remainder of cross frame members 22 and side rail supports 30 of trailer frame 14 have a C-channel configuration, while side rails 28, 28*b* have an L-shaped configuration and are commonly referred to as angle members.

To assemble trailer frame 14, the frame members are typically welded to one another as is well known in the industry. Plate members 48 serve as the attachment points for diagonal extension frame members 32 and base cross frame member 26. This design provides a mounting configuration similar to mounting to a box structure as opposed to mounting the members to the contours of I-beams. In addition, the design allows for base cross frame member 26, diagonal extension frame members 32, and central longitudinal extension frame member 36 to be assembled so that upper sides thereof are approximately flushed to deck side 43 of main support frame members 20. This facilitates the installation of the trailer deck on the trailer frame in a level and firm manner.

Projection 58 on the end of diagonal extension frame members 32 overlaps the respective bottom side 45 of lower flange 44 of the main support frame members. Likewise, projections 68 and 70 on base cross frame member 26 also overlaps the respective bottom side 45 of lower flange 44 of the main support frame members. Configured in this manner, the upper portion of notched ends 52, 60 and 62 are welded or otherwise attached in a known manner to the respective plate members 48, while projections 58, 68, and 70 are welded or otherwise attached in a known manner to respective lower flanges 44 of main support frame members 20.

It should also be realized that in the embodiment shown, front cross frame member 24 and the cross frame members 22 forward of base cross frame member 26 must either be cut and welded to diagonal extension frame members 32 and central longitudinal extension frame member 36 at the intersecting points, or holes may be cut in diagonal extension frame members 32 and central longitudinal extension frame member 36 to accommodate cross frame members 22 and front cross frame member 24.

While the invention has been taught with specific reference to the above described embodiment, one skilled in the art will recognize that changes can be made in form and detail without departing from the spirit and scope of the invention. For example, although specific structural configurations have been identified for the various members of trailer frame 14, any suitable structural configuration may be substituted for those described. In addition, although trailer frame 14 has been shown with two main support frame members 20, additional main support frame members may be utilized. Also, main support frame members may be other than parallel to one another as is also true with cross frame members 22, front cross member 24, base cross frame member 26, and side rail supports 30. Further, additional diagonal extension frame members 32 and/or central longitudinal extension frame members 36 may also be employed to provide additional structural rigidity. As such, the described embodiment is to be considered in all respects only as illustrative and not restrictive. The scope of the invention is, therefore, indicated by the following claims rather than by the description.

What is claimed is:

1. A trailer frame for use on a trailer comprising:
    at least one pair of main support frame members extending in a longitudinal direction of the trailer frame, said main support frame members having a deck side and a bottom side;
    at least one pair of wheels mounted to an axle to provide rolling movement to the trailer frame from a tow vehicle;
    a plurality of cross frame members extending between said main support frame members; and
    a plurality of extension frame members converging to a hitch point at a front extension of the trailer frame, said extension frame members being attached to respective main support frame members, and one end of each extension frame member being notched so that upper sides of said extension frame members are flush with said deck side of said main support frame members while a portion of lower sides of said extension frame members overlap said bottom sides of said main support frame members.

2. The trailer frame as set forth in claim 1, wherein said main support frame members include I-beams.

3. The trailer frame as set forth in claim 2, further including plate members extending between and attached to flanges on each of the I-beam main support frame members.

4. The trailer frame as set forth in claim 3, wherein the plate members are attached at inward edges of said flanges and said extension frame members are mounted to respective said plate members.

5. The trailer frame as set forth in claim 4, wherein at least one of said cross frame members is also mounted to said plate members.

6. The trailer frame as set forth in claim 5, wherein said cross frame member mounted to said plate members is notched and mounted so that an upper side is flush with said deck side of said main support frame members while a portion of a lower side overlaps said bottom sides of said main support frame members.

7. The trailer frame as set forth in claim 1, wherein said pair of extension frame members extend in a diagonal direction from said main support frame members to said hitch point and further including a third extension frame member extending between said pair of diagonally extending extension frame members.

8. The trailer frame as set forth in claim 7, wherein said extension frame members have a rectangular tubular cross section.

9. The trailer frame as set forth in claim 8, wherein at least one of said cross frame members also has a rectangular tubular cross section, and one end of said third extension frame member is mounted thereto.

10. The trailer frame as set forth in claim 9, further including plate members mounted between flanges on each of the main support frame members, and one end of each of said diagonally extending extension frame members is mounted to a respective plate member.

11. A trailer frame comprising:
    at least one pair of main support frame members extending in a longitudinal direction of the trailer frame, said main support frame members each including an upper flange and a lower flange and a plate member extending between and attached to said upper and lower flanges on each of said main support frame members;
    at least one pair of wheels mounted to an axle to provide rolling movement to the trailer frame from a tow vehicle;
    a plurality of cross frame members extending between said main support frame members; and
    a plurality of diagonal frame members converging to a hitch point at a front extension of the trailer frame, one end of each of said diagonal frame members mounted to a respective said plate member on said main support frame members.

12. The trailer frame as set forth in claim 11, wherein said main support frame members include I-beams.

13. The trailer frame as set forth in claim 11, wherein said main support frame members have a deck side and a bottom side, and said diagonal members are mounted so that upper sides thereof are flush with said deck side of said main support members while a portion of lower sides of said diagonal frame members extend below said bottom sides of said main support frame members.

14. The trailer frame as set forth in claim 11, wherein said diagonal frame members are notched at one end where attached to said plate members, and a portion of said diagonal members overlaps respective said lower flanges on each of said main support members.

15. The trailer frame as set forth in claim 14, wherein at least one of said cross frame members is notched at both ends, and a portion of each end of said notched cross frame member overlaps said lower flange on each of said main support frame members.

16. The trailer frame as set forth in claim 15, wherein an upper side of said notched cross frame member is flush with said deck side of said main support frame members.

17. The trailer frame as set forth in claim 16, wherein said diagonal frame members and said notched cross frame members have a rectangular tubular cross section.

18. The trailer frame as set forth in claim 15, further including a longitudinal extension frame member extending between said diagonal frame members.

19. The trailer frame as set forth in claim 18, wherein one end of said longitudinal extension frame member is attached to said notched cross frame member, and the other end extends to said hitch point.

20. A trailer frame comprising:
    at least one pair of main support frame members extending in a longitudinal direction of the trailer frame, said main support frame members having a deck side and a bottom side;
    a plurality of cross frame members extending between said main support frame members; and
    a plurality of extension frame members converging to a hitch point at a front extension of the trailer frame, said extension frame members and at least one of said cross frame members being mounted with upper sides thereof flush with said deck sides of said main support frame members, and lower sides of said extension frame members and said one cross frame members extending lower than said bottom sides of said main support frame members.

21. The trailer frame as set forth in claim 20, wherein one end of each of at least two of said extension frame members is notched.

22. The trailer frame as set forth in claim 21, wherein a portion of each notched end of said extension frame members overlaps respective said bottom sides of said main support frame members.

23. The trailer frame as set forth in claim 21, wherein said cross frame member having an upper side mounted flush with said deck side also has notched ends, and a portion of each notched end overlaps respective said bottom sides of said main support frame members.

24. The trailer frame as set forth in claim 23, wherein said pair of main support frame members each include an I-beam, and said extension frame members and said at least one cross frame member have a rectangular tubular cross section.

25. The trailer frame as set forth in claim 20, wherein said main support frame members have an upper flange and a lower flange and a plate attached to and extending between inner edges of said flanges on each of said main support frame members.

26. The trailer frame as set forth in claim 25, including three extension frame members with one of said extension frame members attached to said at least one cross frame member and extending therefrom in a longitudinal direction.

27. The trailer frame as set forth in claim 26, wherein ends of said at least one cross frame member and one end of each of said other two extension frame members are mounted to respective plate members on said main support frame members.

28. A towable trailer comprising:
    at least one pair of wheels mounted to an axle to provide rolling movement to the trailer from a tow vehicle;
    a trailer deck; and
    a trailer frame supporting said trailer deck including,
        at least one pair of main support frame members extending in a longitudinal direction of the trailer, said main support members having a deck side and a bottom side,
        a plurality of cross frame members extending between said main support frame members, at least one of said cross frame members having notched ends with the notched ends mounted to respective main support frame members, and an upper side of said notched cross frame member being flush with said deck side of said main support frame members, and
        a plurality of diagonal frame members converging to a hitch point at a front extension of the trailer frame, one end of each diagonal frame member being notched and mounted to respective said main support frame members with upper sides of said diagonal members being flush with said deck sides.

29. The trailer as set forth in claim 28, wherein portions of said ends of said notched cross frame member and said diagonal frame members overlap said bottom sides of said main support frame members.

30. The trailer as set forth in claim 29, wherein said notched cross frame member and said diagonal frame members have a rectangular tubular cross section, and said main support frame members include I-beams.

31. The trailer as set forth in claim 28, further including a longitudinal extension frame member extending between said diagonal frame members, and one end of said longitudinal extension frame member is attached to said notched cross frame member and the other end extends to said hitch point.

32. The trailer as set forth in claim 28, wherein said main support frame members each include an upper flange and a lower flange and a plate member extending between and attached to said upper and lower flanges on each of said main support members, and a portion of said notched ends being mounted to said plate members.

33. A towable trailer comprising:
    at least one pair of wheels mounted to an axle providing rolling movement to the trailer frame from a tow vehicle;
    a trailer deck; and
    a trailer frame including,
        at least one pair of main support frame members extending in a longitudinal direction of the trailer frame, said main support frame members each including an upper flange and a lower flange and a plate member extending between and attached to said upper and lower flanges on each of said main support frame members, a plurality of cross frame members extending between said main support frame members, at least one of said cross frame members being notched at the ends thereof with a portion of said notched ends being attached to said plate members, and a plurality of extension frame members attached at one end thereof to respective main support frame members and converging to a hitch point at a front extension of the trailer frame.

34. The trailer as set forth in claim 33, wherein said extension frame members are also notched at said ends attached to said main frame support members, and a portion of said notched ends of said extension frame members and said notched cross frame member overlaps respective bottom sides of said main support frame members.

35. The trailer as set forth in claim 34, wherein in upper sides of said extension frame members and said notched cross frame member are flush with deck sides of said main support frame members.

36. The trailer as set forth in claim 35, wherein said main support frame members include I-beams, and said extension frame members and said notched cross frame members have a rectangular tubular cross section.

* * * * *